United States Patent
Huang et al.

(10) Patent No.: US 10,289,559 B2
(45) Date of Patent: May 14, 2019

(54) NON-VOLATILE MEMORY APPARATUS AND OPERATING METHOD THEREOF

(71) Applicant: VIA Technologies, Inc., New Taipei (TW)

(72) Inventors: Sheng-Huei Huang, New Taipei (TW); Yi-Lin Lai, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 313 days.

(21) Appl. No.: 15/166,272

(22) Filed: May 27, 2016

(65) Prior Publication Data

US 2017/0277472 A1    Sep. 28, 2017

(30) Foreign Application Priority Data

Mar. 22, 2016   (TW) .............................. 105108737 A

(51) Int. Cl.
  *G06F 3/06*   (2006.01)
  *G06F 11/10*  (2006.01)
  (Continued)

(52) U.S. Cl.
  CPC ........ *G06F 12/1009* (2013.01); *G06F 3/0616* (2013.01); *G06F 3/0649* (2013.01);
  (Continued)

(58) Field of Classification Search
  CPC ............. G06F 11/1471; G06F 11/1048; G06F 11/108; G06F 11/1666; G06F 11/2094
  See application file for complete search history.

(56) References Cited

U.S. PATENT DOCUMENTS 6,539,503 B1    3/2003  Walker
  2004/0210708 A1  10/2004  Conley
  (Continued)

FOREIGN PATENT DOCUMENTS

TW    201243593    11/2012
  TW     1527037     3/2016
  (Continued)

OTHER PUBLICATIONS

"Office Action of Taiwan Related Application No. 105108740," dated Mar. 9, 2017, p. 1-p. 8.
(Continued)

*Primary Examiner* — Jigar P Patel
(74) *Attorney, Agent, or Firm* — JCIPRNET

(57) ABSTRACT

A non-volatile memory apparatus including a non-volatile storage circuit, a main memory and a controller, and an operating method thereof are provided. Each of a plurality of logical block address groups includes a plurality of logical block addresses. Each of the logical block address groups is assigned with a group age parameter. The adjusting of the group age parameters is triggered by a writing instruction of a host. When an age parameter of the group age parameters exceeds a predetermined range, the controller performs a scanning operation to the non-volatile storage blocks of the non-volatile storage circuit corresponding to a corresponding logical block address group of the age parameter, so as to check an error-bit quantity. The controller decides whether the storage block data-moving operation is performed to the non-volatile storage block corresponding to the corresponding logical block address group based on the results of the scanning operation.

44 Claims, 4 Drawing Sheets

(51) Int. Cl.
*G06F 11/14* (2006.01)
*G06F 12/02* (2006.01)
*G06F 12/1009* (2016.01)

(52) U.S. Cl.
CPC .......... *G06F 3/0679* (2013.01); *G06F 3/0688* (2013.01); *G06F 11/1048* (2013.01); *G06F 11/1471* (2013.01); *G06F 12/0246* (2013.01); *G06F 2212/1016* (2013.01); *G06F 2212/2022* (2013.01); *G06F 2212/7201* (2013.01); *G06F 2212/7204* (2013.01)

(56) References Cited

U.S. PATENT DOCUMENTS

| | | | | |
|---|---|---|---|---|
| 2007/0276995 | A1* | 11/2007 | Caulkins | G06F 3/0616 711/113 |
| 2011/0238890 | A1 | 9/2011 | Sukegawa | |
| 2011/0296133 | A1* | 12/2011 | Flynn | G06F 11/1048 711/171 |
| 2012/0059978 | A1 | 3/2012 | Rosenband et al. | |
| 2013/0275651 | A1* | 10/2013 | D'Abreu | G11C 11/5628 711/103 |
| 2014/0223079 | A1 | 8/2014 | Zhang et al. | |
| 2016/0179386 | A1* | 6/2016 | Zhang | G06F 3/0679 711/103 |

FOREIGN PATENT DOCUMENTS

| | | |
|---|---|---|
| TW | 201608475 | 3/2016 |
| TW | I525631 | 3/2016 |

OTHER PUBLICATIONS

"Notice of Allowance of Taiwan Counterpart Application", dated Mar. 29, 2017, p. 1-p. 7.

* cited by examiner

NON-VOLATILE MEMORY APPARATUS AND OPERATING METHOD THEREOF

CROSS-REFERENCE TO RELATED APPLICATION

This application claims the priority benefit of Taiwan application serial no. 105108737, filed on Mar. 22, 2016. The entirety of the above-mentioned patent application is hereby incorporated by reference herein and made a part of this specification.

BACKGROUND OF THE INVENTION

Field of the Invention

The invention relates to a memory apparatus, and particularly relates to a non-volatile memory apparatus and an operating method thereof.

Description of Related Art

Generally, during an operating process of a solid state disk/drive (SSD) or a memory disk, a mapping table is adopted to record a mapping relationship (or a transforming relationship) between logical addresses and physical addresses. The logical address may include a logical block address (LBA) and/or a logical page address, and the physical address may include a physical block address (PBA) and/or a physical page address. A host generally accesses data stored in the SSD or the memory disk according to variety of modes including page mapping, block mapping, a replacement block or log block, etc. Although the content stored in the mapping table is varied along with the different modes, when the SSD or the memory disk receives an access instruction from the host, the SSD or the memory disk is required to transform a logical address of the access instruction into a physical address of a flash memory in the SSD or the memory disk according to the mapping table, and then the access instruction is executed to a physical memory (a physical block or a physical page) corresponding to the transformed physical address.

During the process of continually executing a plurality of access instructions of the host, the mapping relationship between the logical addresses and the physical addresses can be correspondingly changed, so that the content of the mapping table can be constantly updated. The mapping table is generally stored in a dynamic random access memory (DRAM) to facilitate accelerating an access speed. When a power-off procedure is executed to the SSD or the memory disk, the mapping table is stored in the flash memory of the SSD or the memory disk to avoid losing the content of the mapping table due to the power-off. When the SSD or the memory disk is powered, an initialisation procedure is executed to the SSD. In the initialisation procedure, the SSD or the memory disk may read the mapping table from the flash memory to write back the mapping table to the DRAM.

Generally, a floating gate of a memory cell of the flash memory has a current leakage phenomenon. In case that a writing operation is not performed to the memory cell, along with increase of time, the current leakage phenomenon of the floating gate of the memory cell becomes more and more severe. The current leakage phenomenon of the floating gate of the memory cell may cause an error of bit data. Regarding a physical page of the flash memory, in case that the writing operation is not performed to the physical page for a long time, along with increase of time, an error-bit quantity of the physical page is increased. Generally, the flash memory is configured with an error checking and correcting (ECC) mechanism. When the error-bit quantity in each unit bit quantity (for example, 1K Bytes, or a bit quantity of one physical page) of data is smaller than a certain tolerance quantity, the ECC mechanism may correct the error bits, such that the flash memory may provide correct data to the host. When the error-bit quantity in each unit bit quantity is greater than the tolerance quantity, the ECC mechanism cannot correct the error bits. When the error bits have a large quantity and cannot be corrected, it represents that the data is lost.

SUMMARY OF THE INVENTION

The invention is directed to a non-volatile memory apparatus and an operating method thereof to flexibly decide a timing of a scanning operation, and dynamically decide whether to perform a storage block data-moving operation according to a result of the scanning operation, so as to avoid data loss.

An embodiment of the invention provides a non-volatile memory apparatus including a non-volatile storage circuit, a main memory and a controller. The non-volatile storage circuit has a plurality of non-volatile storage blocks addressed by a plurality of physical block addresses. The main memory is configured to store a mapping table, where the mapping table is configured to record a transforming relationship between a plurality of logical block addresses and the physical block addresses. The controller is coupled to the main memory and the non-volatile storage circuit. The controller groups the logical block addresses into a plurality of logical block address groups, and each of the logical block address groups includes a plurality of logical block addresses. Each of the logical block address groups is assigned with a group age parameter. Adjusting of the group age parameters is triggered by a writing instruction of a host. When an age parameter of the group age parameters exceeds a predetermined range, the controller performs a scanning operation to the non-volatile storage blocks corresponding to the logical block addresses of a corresponding logical block address group corresponding to the age parameter, so as to check an error-bit quantity. The controller decides whether to perform a storage block data-moving operation to one storage block among the non-volatile storage blocks corresponding to the logical block addresses of the corresponding logical block address group based on a result of the scanning operation.

An embodiment of the invention provides an operating method of a non-volatile memory apparatus. The operating method includes following steps. A non-volatile storage circuit is configured, where the non-volatile storage circuit has a plurality of non-volatile storage blocks addressed by a plurality of physical block addresses. A main memory is configured to store a mapping table, where the mapping table is configured to record a transforming relationship between a plurality of logical block addresses and the physical block addresses. A controller is configured to group the logical block addresses into a plurality of logical block address groups, where each of the logical block address groups includes a plurality of logical block addresses, and each of the logical block address groups is assigned with a group age parameter. Adjusting of the group age parameters is triggered by a writing instruction of a host. When an age parameter of the group age parameters exceeds a predetermined range, the controller performs a scanning operation to the non-volatile storage blocks corresponding to the logical block addresses of a corresponding logical block address group corresponding to the age parameter, so as to check an error-bit quantity. The controller decides whether to perform a storage block data-moving operation to one storage block among the non-volatile storage blocks corresponding to the logical block addresses of the corresponding logical block address group based on a result of the scanning operation.

According to the above descriptions, the non-volatile memory apparatus and the operating method thereof of the invention may record the respective group age parameter of a plurality of the logical block address groups. The controller may flexibly decide a timing of the scanning operation according to the group age parameters. According to the result of the scanning operation, the controller may dynamically decide whether to perform the storage block data-moving operation to avoid data loss.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
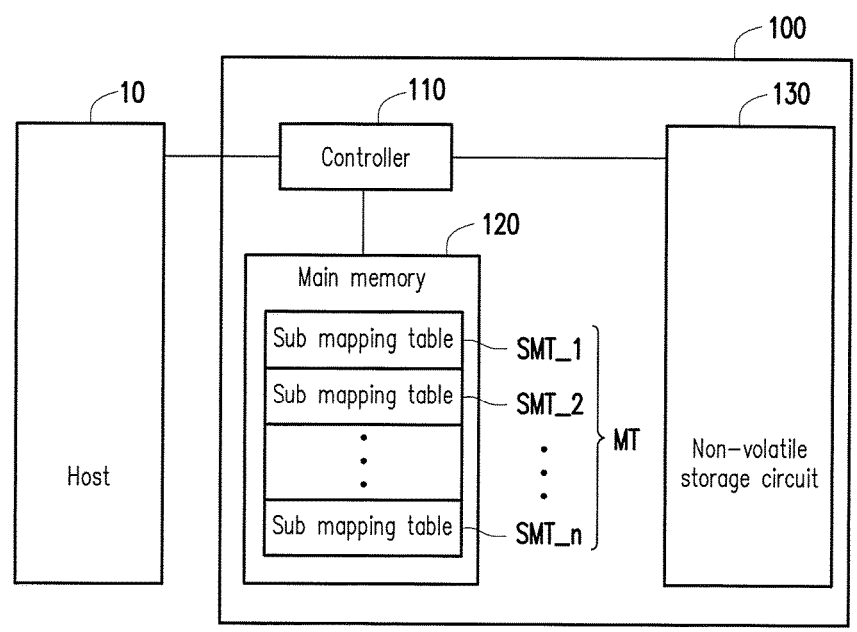
FIG. 1 is a circuit block schematic diagram of a non-volatile memory (NVM) apparatus 100 according to an embodiment of the invention.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of a non-volatile memory (NVM) apparatus 100 according to an embodiment of the invention. The NVM apparatus 100 is coupled to a host 10. The NVM apparatus 100, for example, includes a personal computer memory card international association (PCMCIA) card, a compact flash (CF) card, a smart media card (SMC), a memory disk, a multimedia card (MMC, RS-MMC, MMC-micro), a security card (SD, miniSD, microSD, SDHC), a universal flash storage (UFS) device, a solid state disk/drive (SSD), etc. According to different application situations, the NVM apparatus 100 may store audio data, image data and/or video data.

The host 10 includes a computer, a handheld electronic apparatus or other electronic apparatus. For example, the host 10 can be a personal computer, a handheld computer, a personal digital assistant (PDA), a portable media player (PMP), a MP3 player, a smart phone, a digital camera, a camcorder, a recorder, a game machine, a fax machine, a scanner, a printer, etc.

The host 10 and the NVM apparatus 100 can be effectively connected through any standardized interface. For example, the standardized interface includes a small computer system interface (SCSI), a serial attached SCSI (SAS), an enhanced small disk interface (ESDI), a serial advanced technology attachment (SATA), a peripheral component interconnect express (PCI-express), an integrated drive electronics (IDE) interface, a universal serial bus (USB), a thunderbolt interface or other interfaces. The interface structure between the host 10 and the NVM apparatus 100 is not limited by the invention.

The NVM apparatus 100 includes a controller 110, a main memory 120 and a non-volatile storage circuit 130. The controller 120 is coupled to the host 10 through the aforementioned standardized interface. The controller 110 is coupled to the main memory 120 and the non-volatile storage circuit 130. The main memory 120 is, for example, a dynamic random access memory (DRAM), a static random access memory (SRAM) or other volatile memory. The non-volatile storage circuit 130 is, for example, a flash memory. The non-volatile storage circuit 130 has a plurality of non-volatile storage blocks addressed by a plurality of physical block addresses. The main memory 120 stores a mapping table MT, where the mapping table MT is configured to record a transforming relationship between a plurality of logical block addresses and the physical block addresses of the non-volatile storage circuit 130. The controller 110 of the NVM apparatus 100 transforms a logical address of an access instruction (for example, a writing instruction, a reading instruction or other instructions) of the host 10 into a physical address of the non-volatile storage circuit 130 according to the mapping table MT in the main memory 120.

In case that none writing operation is performed to memory cells of the flash memory, along with increase of time, a current leakage phenomenon of a floating gate of the memory cell becomes more severe. The current leakage phenomenon of the floating gate of the memory cell may cause an error of stored bit data. Taking a physical page of a flash memory (the non-volatile storage circuit 130) as an example, in case that none writing operation is performed to the physical page for a long time, along with increase of time, an error-bit quantity of the physical page is increased. When the error-bit quantity in one physical page is smaller than a certain tolerance quantity, an error checking and correcting (ECC) mechanism may correct the error bits, such that the non-volatile storage circuit 130 may provide correct data to the host 10. When the error-bit quantity in the physical page is greater than the tolerance quantity, the ECC mechanism cannot correct the error bits. When the error bits have a large quantity and cannot be corrected, it may cause loss of data. Therefore, a mechanism capable of opportunely moving/copying data in the physical page (or physical block) with many error bits to another physical page (or physical block) in case that the data of the physical page can still be corrected by the ECC mechanism.

Figure 2:
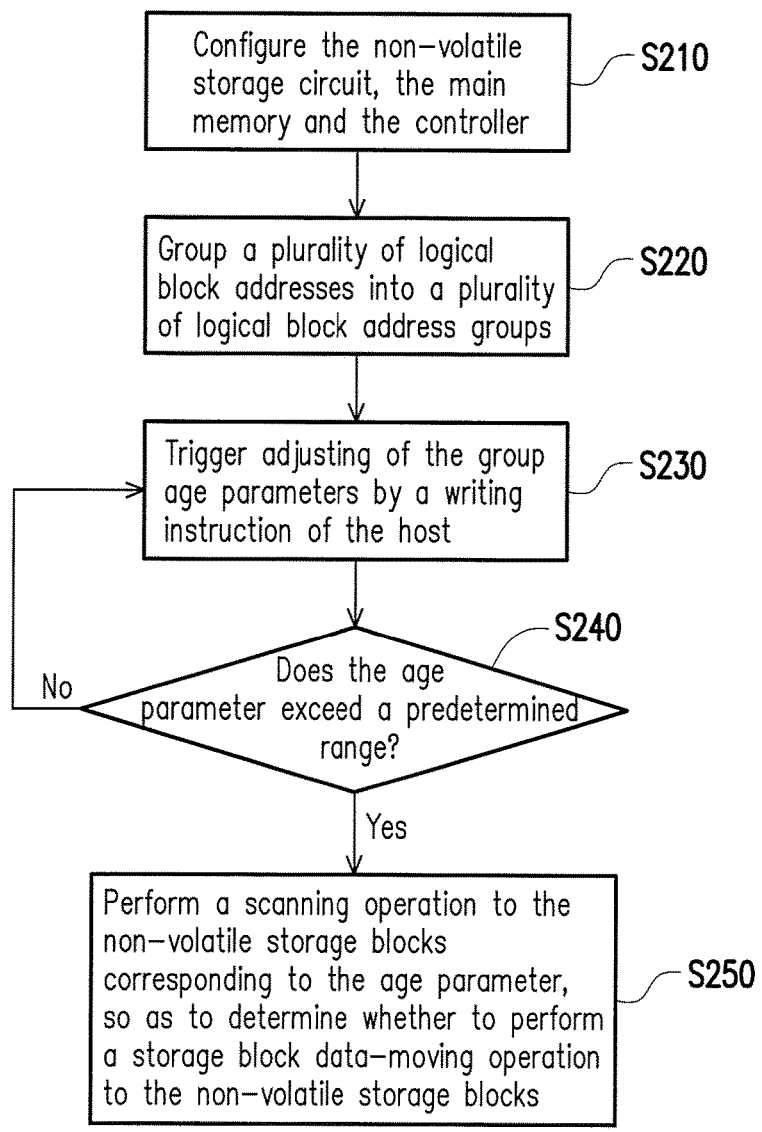
FIG. 2 is a flowchart of an operating method of the NVM apparatus of FIG. 1 according to an embodiment of the invention.

FIG. 2 is a flowchart of an operating method of the NVM apparatus 100 of FIG. 1 according to an embodiment of the invention. Referring to FIG. 1 and FIG. 2, in step S210, the non-volatile storage circuit 130, the main memory 120 and the controller 110 are configured to the NVM apparatus 100. In step S220, the controller 110 groups a plurality of logical addresses (for example, logical block addresses (LBA)) of the host end into a plurality of logical block address groups, where each of the logical block address groups includes a plurality of logical block addresses. For example, it is assumed that there are 10000 logical block addresses, and in the step S220, the controller 110 groups the logical block addresses into 400 logical block address groups, where each of the logical block address groups includes 25 logical block addresses. The quantity of the aforementioned logical block addresses and the quantity of the logical block address groups can be determined according to an actual design requirement.

The aforementioned grouping method can be determined according to an actual design requirement. In some embodiments, the grouping method of the logical block addresses can be determined according to a sequence of values of the logical block addresses. For example, it is assumed that each of the logical block address groups has 30 logical addresses, and in the step S220, the logical block addresses 0-29 can be grouped into a logical block address group 0, and the logical block addresses 30-59 can be grouped into a logical block address group 1, and the others are deduced by analogy. In some other embodiments, based on a wear-leveling consideration or other considerations, in the step S220, the logical block addresses can be grouped in a discontinuous manner. For example, it is assumed that 10000 logical block addresses are grouped into 400 logical block address groups, and each of the logical block address groups has 25 logical block addresses, in the step S220, the logical block addresses 0, 400, 800, 1200, 1600, . . . , 9600 can be grouped into a first logical block address group, and the logical block addresses 1, 401, 801, 1201, 1601, . . . , 9601 can be grouped into a second logical block address group, and the others are deduced by analogy, and finally the logical block addresses 399, 799, 1199, 1599, 1999, . . . , 9999 are grouped into a $400^{th}$ logical block address group. In other embodiments, in the step S220, a hash function can be adopted to group the logical block addresses.

In some embodiments, in the step S220, the controller 110 may further divide the mapping table MT in the main memory 120 into a plurality of sub mapping tables, for example, n sub mapping tables SMT_1, SMT_2, . . . , SMT_n shown in FIG. 1. Namely, the logical block addresses of the host 10 are grouped into a plurality of groups, and the mapping table MT is divided into a plurality of sub mapping tables SMT_1-SMT_n according to the groups. The logical block addresses of the sub mapping tables SMT_1-SMT_n are not overlapped to each other, and the corresponding physical block addresses (PBA) are not overlapped. After the logical block addresses are grouped in the step S220, the logical block address corresponding to each of the sub mapping table is fixed, and the corresponding physical block addresses are dynamically allocated. All of unallocated free blocks in the non-volatile storage circuit 130 are put into a free block pool. When a certain sub mapping table requires an extra non-volatile storage block (a physical block), the controller 110 may apply for a free block from the free block pool for the certain sub mapping table. Allocation of the free block applied from the free block pool can be implemented based on a wear levelling strategy.

Each of the logical block address groups (or the sub mapping tables SMT_1-SMT_n) is assigned with a group age parameter. For example, the first logical block address group (or the sub mapping table SMT_1) is assigned with a group age parameter Age_1, the second logical block address group (or the sub mapping table SMT_2) is assigned with a group age parameter Age_2, and the $n^{th}$ logical block address group (or the sub mapping table SMT_n) is assigned with a group age parameter Age_n. Initial values of the group age parameters Age_1-Age_n can be determined according to a design requirement. For example, in some embodiments, the initial values of the group age parameters Age_1-Age_n can be −15, 0, 10 or other real numbers. The group age parameters Age_1-Age_n respectively represent a time length of a period when each of the logical block address groups (or the sub mapping tables SMT_1-SMT_n) is not written with data. In some embodiments, the controller 110 may trigger adjustment of the group age parameters Age_1-Age_n in a timing manner. In some other embodiments, the controller 110 may trigger adjustment of the group age parameters Age_1-Age_n according to a writing instruction of the host 10 (step S230).

For example, in some embodiments, when the host 10 sends a writing instruction to the controller 110, in the step S230, the controller 110 may respectively add a step value to the group age parameters Age_1-Age_n. The step value can be determined according to a design requirement. For example, the step value can be 1 or other real number. In some other embodiments, when the host 10 sends the writing instruction to the controller 110, in the step S230, the controller 110 may respectively subtract the step value from the group age parameters Age_1-Age_n.

In some other embodiments, the controller 110 has a pointer for pointing a target age parameter in the group age parameters Age_1-Age_n. When the host 10 sends the writing instruction to the controller 110, in the step S230, the controller 110 only adds a step value to the target age parameter pointed by the pointer, and controls the pointer to point to a next age parameter in the group age parameters Age_1-Age_n to serve as a new target age parameter. For example, it is assumed that the pointer points to the group age parameter Age_1, when the host 10 sends the writing instruction to the controller 110, the controller 110 only adds a step value to the target age parameter (which is the group age parameter Age_1) pointed by the pointer, and the other group age parameters Age_2-Age_n are not changed. After adding the group age parameter Age_1 by the step value, the controller 110 controls the pointer to point to a next age parameter (for example, the group age parameter Age_2) to serve as the new target age parameter. When the host 10 sends another writing instruction to the controller 110, the controller 110 only adds a step value to the target age parameter (which is the group age parameter Age_2) pointed by the pointer, and the other group age parameters (for example, Age_1 and Age_n) are not changed. After adding the group age parameter Age_2 by the step value, the controller 110 controls the pointer to point to a next age parameter (for example, the group age parameter Age_3) to serve as the new target age parameter.

When the host 10 sends the writing instruction to the controller 110, the controller 110 transforms a target logical block address of the writing instruction into a target physical block address according to the mapping table MT of the main memory 120, and accesses a non-volatile storage block (physical block) addressed by the target physical block address in the non-volatile storage circuit 130 according to the writing instruction. After the data writing operation of the non-volatile storage block (physical block) is completed, the controller 110 may reset an age parameter corresponding to the target logical block address in the group age parameters Age_1-Age_n to an initial value. For example, it is assumed that the logical block address of the writing instruction sent by the host 10 belongs to an $n^{th}$ logical block address group (or a sub mapping table SMT_n), the controller 10 transforms the target logical block address of the writing instruction into the target physical block address according to the sub mapping table SMT_n of the main memory 120, and accesses the non-volatile storage block (physical block) addressed by the target physical block address in the non-volatile storage circuit 130 according to the writing instruction. After the data writing operation of the non-volatile storage block (physical block) is completed, the controller 110 may reset the group age parameter Age_n corresponding to the target logical block address to an initial value. The initial value can be determined according to an actual design requirement. For example, the initial value can be 0 or other real numbers.

In step S240, the controller 110 checks whether the group age parameters Age_1-Age_n exceed a predetermined range. The predetermined range can be determined according to an actual design requirement. If none of the group age parameters Age_1-Age_n exceeds the predetermined range. The controller 110 may return to the step S230 to wait for the host 10 to send a next writing instruction. When one age parameter in the group age parameters Age_1-Age_n exceeds the predetermined range. The controller 110 may execute a step S250 to perform a scanning operation to the non-volatile storage blocks corresponding to the logical block addresses of a corresponding logical block address group corresponding to the age parameter, so as to check an error-bit quantity. For example (though the invention is not limited thereto), in the step S240, the controller 110 may compare the group age parameters Age_1-Age_n with a threshold value to determine a relationship between the group age parameters Age_1-Age_n and the predetermined range. The threshold value can be determined according to an actual design requirement. It is assumed that the controller 110 determines that the group age parameter Age_1 of the $1^{st}$ logical block address group (or the sub mapping table SMT_1) is greater than the threshold value, the controller 110 may perform the scanning operation to one or a plurality of non-volatile storage blocks (the physical blocks of the non-volatile storage circuit 130) corresponding to the logical block addresses of the $1^{st}$ logical block address group (or the sub mapping table SMT_1) corresponding to the group age parameter Age_1, so as to check the error-bit quantity.

Implementations of the step S230 and S240 are not limited to the above description. For example, in some other embodiments, when the host 10 sends the writing instruction to the controller 110, in the step S230, the controller 110 only decreases the target age parameter pointed by the pointer by one step value, and changes the pointer to point to a next age parameter in the group age parameters Age_1-Age_n to serve as the new target age parameter. For example, it is assumed that the pointer points to the group age parameter Age_1. When the host 10 sends the writing instruction to the controller 110, the controller 110 only decreases the target age parameter (which is the group age parameter Age_1) pointed by the pointer by one step value, and the other group age parameters Age_2-Age_n are not changed. After decreasing the group age parameter Age_1 by the step value, the controller 110 controls the pointer to point to a next age parameter (for example, the group age parameter Age_2) to serve as the new target age parameter. When the host 10 sends another writing instruction to the controller 110, the controller 110 only decreases the target age parameter (which is the group age parameter Age_2) pointed by the pointer by the step value, and the other group age parameters (for example, Age_1 and Age_n) are not changed. After decreasing the group age parameter Age_2 by the step value, the controller 110 controls the pointer to point to a next age parameter (for example, the group age parameter Age_3) to serve as the new target age parameter. In the step S240, the controller 110 compares the group age parameters Age_1-Age_n with a threshold value to determine a relationship between the group age parameters Age_1-Age_n and the predetermined range. The threshold value can be determined according to an actual design requirement. It is assumed that the controller 110 determines that the group age parameter Age_1 of the $1^{st}$ logical block address group (or the sub mapping table SMT_1) is smaller than the threshold value, the controller 110 performs the scanning operation to one or a plurality of non-volatile storage blocks (the physical blocks of the non-volatile storage circuit 130) corresponding to the logical block addresses of the $1^{st}$ logical block address group (or the sub mapping table SMT_1) corresponding to the group age parameter Age_1 (step S250), so as to check the error-bit quantity.

In the step S250, the controller 110 may further decide whether to perform a storage block data-moving operation to one or a plurality of the non-volatile storage blocks corresponding to the logical block addresses of the corresponding logical block address group based on a result of the scanning operation. For example, it is assumed that the result of the scanning operation represents that the error-bit quantity of one non-volatile storage block (a certain physical block of the non-volatile storage circuit 130, which is referred to as a suspicious storage block) corresponding to the $1^{st}$ logical block address group (the sub mapping table SMT_1) corresponding to the group age parameter Age_1 is too large, in the step S250, the controller 110 may perform a storage block data-moving operation to the suspicious storage block corresponding to the $1^{st}$ logical block address group (the sub mapping table SMT_1). The controller 110 may move the data of the suspicious storage block to a spare storage block (i.e. apply for a free block from the free block pool), and the controller 110 resets the group age parameter Age_1 corresponding to the suspicious storage block to an initial value. The initial value can be determined according to an actual design requirement. For example, the initial value can be 0 or other real numbers. After the data of the suspicious storage block is moved to the spare storage block, the sub mapping table SMT_1 is updated to replace the suspicious storage block by the spare storage block, and release the suspicious storage block to the free block pool.

Therefore, the non-volatile memory apparatus 100 and the operating method thereof of the present embodiment may record the respective group age parameters Age_1-Age_n of a plurality of logical block address groups (or the sub mapping tables SMT_1-SMT_n). The group age parameters Age_1-Age_n may respectively represent a time length of a period when none writing operation is performed to each of the logical block address groups. In case that none writing operation is performed to a physical block for a long time, along with increase of time, the error-bit quantity of the physical block is accordingly increased. The controller 110 may flexibly determine a timing of the scanning operation according to the group age parameters Age_1-Age_n, so as to opportunely check an error-bit quantity of the corresponding storage block (physical block). According to the result of the scanning operation, the controller 110 may dynamically determine whether to perform the storage block data-moving operation, so as to avoid data loss of the storage block (physical block).

Figure 3:
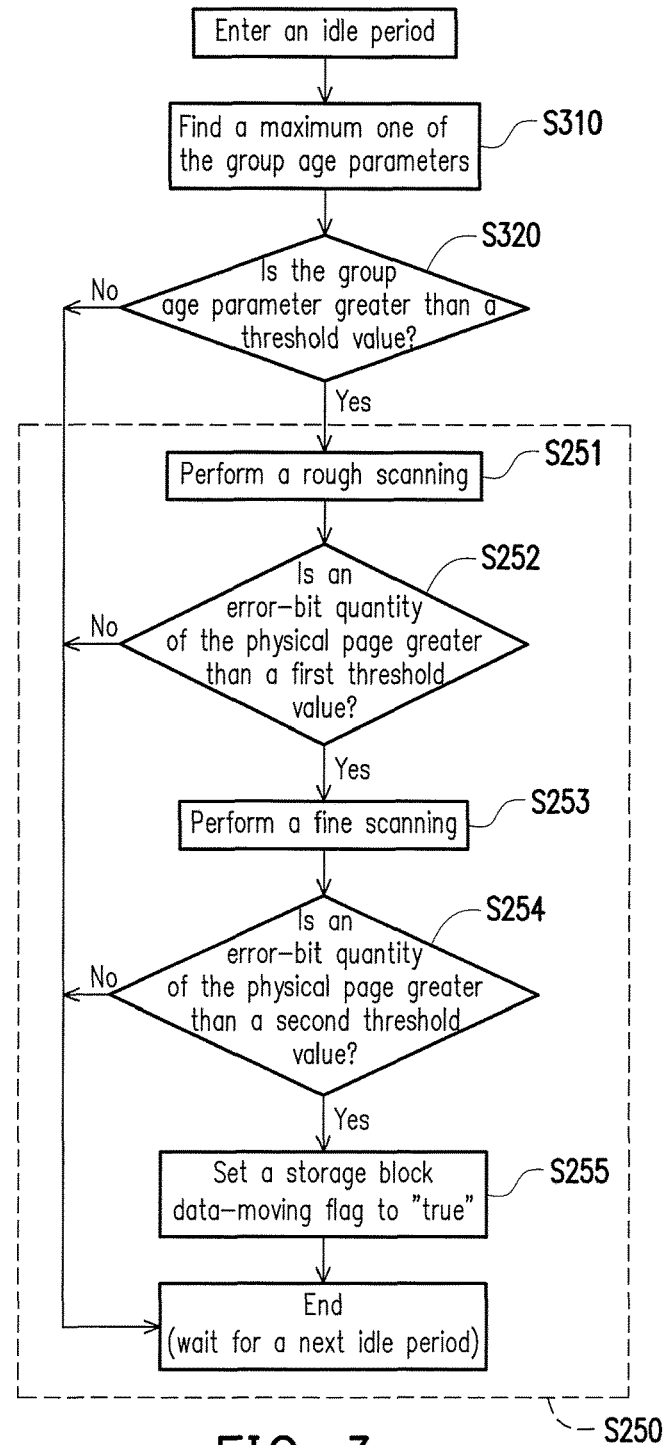
FIG. 3 is a flowchart of an operating method of the NVM apparatus of FIG. 1 according to another embodiment of the invention.

FIG. 3 is a flowchart of an operating method of the NVM apparatus 100 of FIG. 1 according to another embodiment of the invention. Generally, after the controller 110 completes processing the current instruction of the host 10, the controller 110 enters an idle period to wait for the next instruction of the host 10. Referring to FIG. 1 and FIG. 3, after entering the idle period, the controller 110 may execute a step S310 to find the maximum one from the respective group age parameters Age_1-Age_n of the logical block address groups (or the sub mapping tables SMT_1-SMT_n). In step S320, the controller 110 determines whether the maximum age parameter found in the step S310 exceeds a threshold value. The threshold value can be determined according to an actual design requirement. When the maximum age parameter found in the step S310 does not exceed the threshold value, it represents that data stored in all of the physical blocks of the non-volatile storage circuit 130 is "young", and the flow of FIG. 3 is ended (to wait for a next idle period). When the maximum age parameter found in the step S310 exceeds the threshold value, it represents that the data stored in one or a plurality of non-volatile storage blocks (the physical blocks of the non-volatile storage circuit 130) corresponding to the maximum age parameter is too "old". Too "old" of the data stored in the physical block means that the error-bit quantity of the physical block is probably too large. Therefore, the controller 110 may execute the step S250 to perform a scanning operation to the non-volatile storage blocks (the physical blocks of the non-volatile storage circuit 130) corresponding to a certain logical block address group corresponding to the maximum age parameter found in the step S310. The scanning operation may further confirm the error-bit quantity of the non-volatile storage blocks (the physical blocks of the non-volatile storage circuit 130). The step S320 and the step S250 shown in FIG. 3 can be deduced according to related descriptions of the step S240 and the step S250 of FIG. 2.

In the embodiment of FIG. 3, the scanning operation of the step S250 includes sub steps S251-S255. In the step S251, the controller 110 performs a rough scanning to the non-volatile storage blocks (the physical blocks of the non-volatile storage circuit 130) corresponding to the corresponding logical block address group (i.e. the group corresponding to the maximum age parameter found in the step S310). In step S252, the controller 110 learns whether the error-bit quantity of the physical page is greater than a first threshold value according to the result of the rough scanning. The first threshold value can be determined according to an actual design requirement. For example (though the invention is not limited thereto), it is assumed that the maximum age parameter found in the step S310 is the group age parameter Age_1, in the step S251, the controller 110 may select one physical page from a plurality of non-volatile storage blocks (the physical blocks of the non-volatile storage circuit 130) corresponding to the first logical block address group (or the sub mapping table SMT_1) randomly (or according to a certain rule), and check the error-bit quantity of the selected physical page. When the error-bit quantity of the selected physical page is smaller than the first threshold value, the flow of FIG. 3 is ended (to wait for the next idle period). When the error-bit quantity of the selected physical page is greater than the first threshold value, it represents that the non-volatile storage blocks (the physical blocks of the non-volatile storage circuit 130) containing the selected physical page are suspicious storage blocks, and the controller 110 executes a step S253 to perform a fine scanning.

The controller 110 determines whether to perform the fine scanning to one suspicious storage block of the non-volatile storage blocks corresponding to the corresponding logical block address group according to the result of the rough scanning. In the step S253, the controller 110 performs the fine scanning to the suspicious storage block (or checks all of physical pages of the suspicious storage block. In an embodiment, the controller 110 may only perform the fine scanning to valid physical pages of the suspicious storage block. A corresponding relationship between the valid physical page addresses and the logical addresses can be recorded in a table. Namely, each of the valid physical page addresses of the memory corresponds to a certain logical address. For example, the valid physical page addresses of the suspicious storage block can be learned through table look-up, and then the fine scanning is performed to the aforementioned valid physical pages. In step S254, the controller 110 determines whether an error-bit quantity of each of the physical pages is greater than a second threshold value according to the result of the fine scanning. The second threshold value can be determined according to an actual design requirement. For example (though the invention is not limited thereto), it is assumed that the maximum age parameter found in the step S310 is the group age parameter Age_2, and the error-bit quantity of one physical page in the physical block corresponding to the group age parameter Age_2 is greater than the first threshold value (which satisfies the steps S252 and S253). In the step S254, when it is determined that the error-bit quantities of all of the physical pages of the suspicious storage block are smaller than the second threshold value, the flow of FIG. 3 is ended (to wait for a next idle period), and now the group age parameter Age_2 is still not reset. The controller 110 may determined whether to perform the storage block data-moving operation to the suspicious storage block according to the result of the fine scanning, so as to move the data in the suspicious storage block to a spare storage block. In the step S254, when it is determined that an error-bit quantity of a certain physical page of the suspicious storage block is grater than the second threshold value, it represents that the error-bit quantity of the suspicious storage block is too large, and the controller 110 may execute the step S255 to prepare to perform the storage block data-moving operation and reset the group age parameter corresponding to the suspicious storage block to the initial value.

Figure 4:
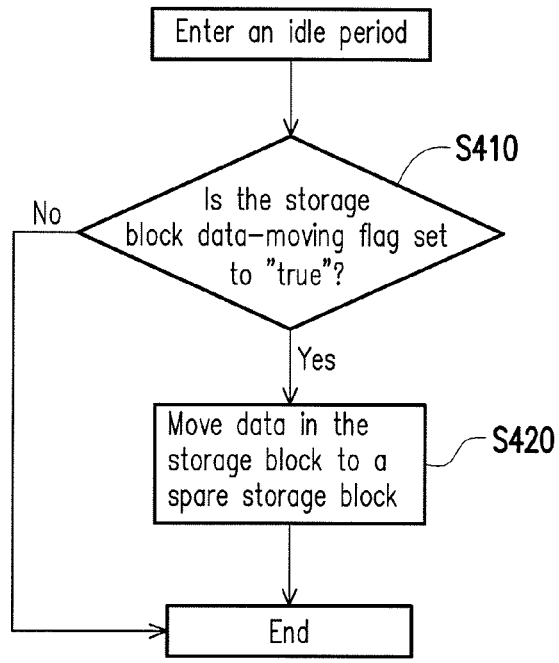
FIG. 4 is a flowchart illustrating an operation method of a storage block data-moving operation according to an embodiment of the invention.

Generally, the idle period is transient. In order to avoid influencing an operating frequency of the NVM apparatus 100, in the step S255, a value of a "storage block data-moving flag" of the suspicious storage block is set to "true" (for example, a logic value 1) other than truly performing the storage block data-moving operation to the suspicious storage block. After the step S255 is completed, the flow of FIG. 3 is ended (to wait for a next idle period). FIG. 4 is a flowchart illustrating an operation method of the storage block data-moving operation according to an embodiment of the invention. Referring to FIG. 1 and FIG. 4, after entering the idle period, the controller 110 may perform a step S410 to check the "storage block data-moving flags" of all of the physical blocks (the non-volatile storage blocks) of non-volatile storage circuit 130. When the controller 110 determines that the values of the "storage block data-moving flags" of all of the physical blocks of non-volatile storage circuit 130 are not "true" in the step S410, the flow of FIG. 4 is ended (to wait for a next idle period). When the controller 110 determines that the value of the "storage block data-moving flag" of one physical block (the non-volatile storage block, which is referred to as the suspicious storage block) is "true" in the step S410, the controller 110 executes a step S420 to move the data of the suspicious storage block to the spare storage block. After moving the data of the suspicious storage block to the spare storage block, the suspicious storage block is replaced by the spare storage block, and the suspicious storage block is released to the free block pool. After the step S420 is completed, the flow of FIG. 4 is ended (to wait for a next idle period).

Figure 5:
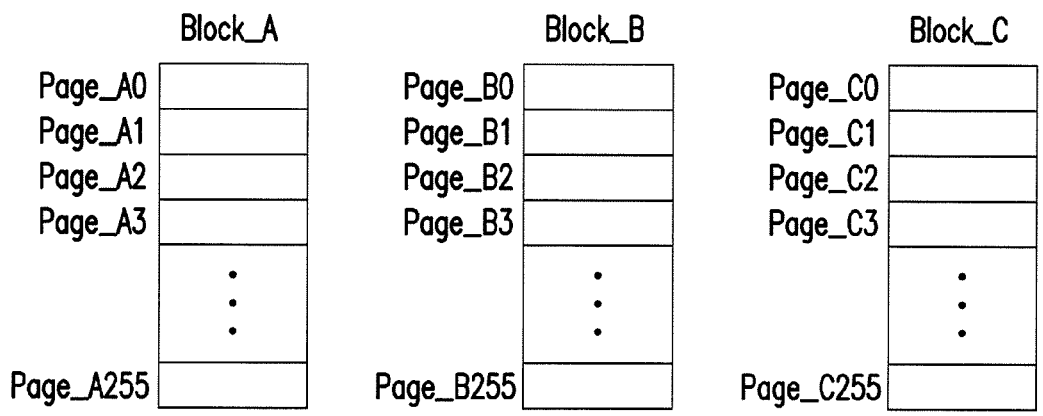
FIG. 5 is a schematic diagram of a part of non-volatile storage blocks (physical blocks) of a non-volatile storage circuit of FIG. 1 according to an embodiment of the invention.

FIG. 5 is a schematic diagram of a part of non-volatile storage blocks (physical blocks) of the non-volatile storage circuit 130 of FIG. 1 according to an embodiment of the invention. It is assumed that in the step S240 of FIG. 2 (or in the step S320 of FIG. 3), it is determined that the group age parameter Age_1 exceeds the predetermined range (for example, greater than the threshold value), so that the non-volatile storage blocks (physical blocks) Block_A, Block_B and Block_C corresponding to the first logical block address group (or the sub mapping table SMT_1) with the group age parameter Age_1 are illustrated in FIG. 5. In FIG. 5, although the three non-volatile storage blocks Block_A, Block_B and Block_C are illustrated, in other embodiments, the number of the non-volatile storage blocks corresponding to one logical block address group can be 2, 4 or more. For example, the non-volatile storage block Block_A includes physical pages Page_A0, Page_A1, Page_A2, Page_A3, . . . , Page_A255, the non-volatile storage block Block_B includes physical pages Page_B0, Page_B1, Page_B2, Page_B3, . . . , Page_B255, and the non-volatile storage block Block_C includes physical pages Page_C0, Page_C1, Page_C2, Page_C3, Page_C255.

Referring to FIG. 1, FIG. 3 and FIG. 5, in some embodiments, the rough scanning of the step S251 may include following operations. The controller 110 may use a page pointer in the step S251, and the page pointer may point to a physical page of one storage block among the non-volatile storage blocks Block_A, Block_B and Block_C corresponding to the corresponding logical block address group of the group age parameter Age_1. For example, the page pointer may point to the physical page Page_A0 of the non-volatile storage block Block_A. In the step S251, the controller 110 may check the error-bit quantity of the physical page Page_A0 pointed by the page pointer. When the error-bit quantity of the physical page Page_A0 pointed by the page pointer is smaller than the first threshold value, the controller 110 changes the page pointer to point to a physical page of another storage block (for example, the physical page Page_B0 of the non-volatile storage block Block_B13) among the non-volatile storage blocks Block_A, Block_B and Block_C corresponding to the corresponding logical block address group of the group age parameter Age_1. The controller 110 may check the error-bit quantity of the physical page Page_B0 pointed by the page pointer. When the error-bit quantity of the physical page Page_B0 pointed by the page pointer is smaller than the first threshold value, the controller 110 changes the page pointer to point to a physical page of another storage block (for example, the physical page Page_C0 of the non-volatile storage block Block_C) among the non-volatile storage blocks Block_A, Block_B and Block_C corresponding to the corresponding logical block address group of the group age parameter Age_1. The controller 110 may check the error-bit quantity of the physical page Page_C0 pointed by the page pointer. When the error-bit quantity of the physical page Page_C0 pointed by the page pointer is smaller than the first threshold value, the controller 110 changes the page pointer to point to a physical page of another storage block (for example, the physical page Page_A1 of the non-volatile storage block Block_A) among the non-volatile storage blocks Block_A, Block_B and Block_C corresponding to the corresponding logical block address group of the group age parameter Age_1. In the current idle period, when the error-bit quantities of the physical pages Page_A0, Page_B0 and Page_C0 are all smaller than the first threshold value, the determination result of the step S252 is "negative", and the flow of FIG. 3 is ended (to wait for a next idle period). Deduced by analogy, in the next idle period, the controller 110 may subsequently check the error-bit quantities of the physical pages Page_A1, Page_B1 and Page_C1. When the error-bit quantities of the physical pages Page_A1, Page_B1 and Page_C1 are all smaller than the first threshold value, the determination result of the step S252 is "negative", and the flow of FIG. 3 is ended (to wait for a next idle period). Deduced by analogy, until all of the physical pages of the non-volatile storage blocks Block_A, Block_B and Block_C corresponding to the corresponding logical block address group of the group age parameter Age_1 are checked, and the error-bit quantities of all of the physical pages of the non-volatile storage blocks Block_A, Block_B and Block_C are smaller than the first threshold value, the rough scanning is completed. When rough scanning of all of the physical pages of the non-volatile storage blocks Block_A, Block_B and Block_C corresponding to the corresponding logical block address group of the group age parameter Age_1 is completed, i.e. when the error-bit quantities of all of the physical pages of the non-volatile storage blocks Block_A, Block_B and Block_C are smaller than the first threshold value, the controller 110 may reset the group age parameter Age_1 to the initial value.

During the rough scanning process, when an error-bit quantity of one physical page of the non-volatile storage blocks Block_A, Block_B and Block_C corresponding to the corresponding logical block address group of the group age parameter Age_1 is greater than the first threshold value, i.e. the determination result of the step S252 is "affirmative", the controller 110 performs the fine scanning to the suspicious storage block containing the physical page (step S253). For example, when the error-bit quantity of the physical page Page_A1 pointed by the page pointer is greater than the first threshold value, the controller 110 performs the fine scanning to the storage block Block_A containing the physical page Page_A1.

Implementation of the rough scanning of the step S251 is not limited to the aforementioned description. For example, in another embodiment, the rough scanning of the step S251 may include following operations. The controller 110 may use a page pointer in the step S251, and the page pointer may point to a physical page of one storage block among the non-volatile storage blocks Block_A, Block_B and Block_C corresponding to the corresponding logical block address group of the group age parameter Age_1. For example, the page pointer may point to the physical page Page_B1 of the non-volatile storage block Block_B. In the step S251, the controller 110 may check the error-bit quantity of the physical page Page_B1 pointed by the page pointer and at least one adjacent physical page. The at least one adjacent physical page refers to one or a plurality of other physical pages located adjacent to the physical page Page_B1 pointed by the page pointer. According to the design requirement, when the page pointer points to the physical page Page_B1, the at least one adjacent physical page may include the physical page Page_B0, the physical page Page_B2, the physical page Page_B3 and/or other physical pages. For example, when the page pointer points to the physical page Page_B1, the at least one adjacent physical page may include the physical page Page_B0 and the physical page Page_B2. When the error-bit quantity of the physical page Page_B1 pointed by the page pointer and the at least one adjacent physical page (for example, Page_B0 and Page_B2) is smaller than the first threshold value, the controller 110 changes the page pointer to point to a physical page of another storage block (for example, the physical page Page_C1 of the non-volatile storage block Block_C) among the non-volatile storage blocks Block_A, Block_B and Block_C corresponding to the corresponding logical block address group of the group age parameter Age_1. The controller 110 may check the error-bit quantity of the physical page Page_C1 pointed by the page pointer and at least one adjacent physical page (for example, Page_C0 and Page_C2). When the error-bit quantity of the physical page Page_C1 pointed by the page pointer and the at least one adjacent physical page (for example, Page_C0 and Page_C2) is smaller than the first threshold value, the controller 110 changes the page pointer to point to a physical page of another storage block (for example, the physical page Page_A2 of the non-volatile storage block Block_A) among the non-volatile storage blocks Block_A, Block_B and Block_C corresponding to the corresponding logical block address group of the group age parameter Age_1. The controller 110 may check the error-bit quantity of the physical page Page_A2 pointed by the page pointer and at least one adjacent physical page (for example, Page_A1 and Page_A3). When the error-bit quantity of the physical page Page_A2 pointed by the page pointer and at least one adjacent physical page (for example, Page_A1 and Page_A3) is smaller than the first threshold value, the controller 110 changes the page pointer to point to a physical page of another storage block (for example, the physical page Page_B2 of the non-volatile storage block Block_B) among the non-volatile storage blocks Block_A, Block_B and Block_C corresponding to the corresponding logical block address group of the group age parameter Age_1. Deduced by analogy, until all of the physical pages of the non-volatile storage blocks Block_A, Block_B and Block_C corresponding to the corresponding logical block address group of the group age parameter Age_1 are checked, and the error-bit quantities of all of the physical pages of the non-volatile storage blocks Block_A, Block_B and Block_C are smaller than the first threshold value, the rough scanning is completed. When rough scanning of all of the physical pages of the non-volatile storage blocks Block_A, Block_B and Block_C corresponding to the corresponding logical block address group of the group age parameter Age_1 is completed, the controller 110 may reset the group age parameter Age_1 to the initial value. During the rough scanning process, when the error-bit quantity of the physical page pointed by the page pointer and the at least one adjacent physical page is greater than the first threshold value, the controller 110 performs the fine scanning to the storage block containing the physical page pointed by the page pointer (step S253).

In some embodiments, the rough scanning of the step S251 may include following operations. The aforementioned page pointer may point physical pages (the physical pages can be adjacent to each other or not adjacent to each other, which is not limited by the invention) in the non-volatile storage blocks according to a look-up table, and the look-up table defines the physical pages required to be roughly scanned in the non-volatile storage blocks. In an embodiment, the look-up table may define a plurality of physical pages of at least one non-volatile storage block, or define a plurality of physical pages of a plurality of non-volatile storage blocks. For example, the controller 110 may sequentially check the error-bit quantities of the physical pages in the non-volatile storage block Block_A according to a look-up table Table1 (not shown). According to the look-up table Table1, when the error-bit quantities of the physical pages pointed by the page pointer in the non-volatile storage block Block_A are smaller than the first threshold value, the controller 110 may change the pointer to point to the physical pages of the non-volatile storage block Block_B corresponding to the corresponding logical block address group of the group age parameter Age_1. Deduced by analogy, until the error-bit quantity of all of the physical pages of the non-volatile storage blocks Block_A, Block_B and Block_C are smaller than the first threshold value, the rough scanning is completed. In another embodiment, each of the non-volatile storage blocks may also have a respective look-up table for defining the physical pages required to be roughly scanned in the respective non-volatile storage blocks. For example, the controller 110 may sequentially check the error-bit quantities of the physical pages in the non-volatile storage block Block_B according to a look-up table Table2 (not shown), and the controller 110 may sequentially check the error-bit quantities of the physical pages in the non-volatile storage block Block_C according to a look-up table Table3 (not shown).

The fine scanning of the step S253 may include following operations. The controller 110 may check all of the physical pages Page_A0-Page_A255 of the storage block Block_A containing the physical page Page_A1 that is pointed by the page pointer, so as to obtain the error-bit quantities of valid data of the physical pages Page_A0-Page_A255. When the error-bit quantities of the respective valid data of the physical pages Page_A0-Page_A255 of the storage block Block_A corresponding to the page pointer are all smaller than the second threshold value, the determination result of the step S254 is "negative", and the controller 110 resets the group age parameter Age_1 corresponding to the corresponding logical block address group (or the sub mapping table SMT_1) to the initial value, and ends the flow of FIG. 3 (to wait for the next idle period). When the error-bit quantity of the valid data of one of the physical pages Page_A0-Page_A255 (for example, the physical page Page_A3) of the storage block Block_A corresponding to the page pointer is greater than the second threshold value, the controller 110 performs the "storage block data-moving operation" to the storage block Block_A corresponding to the page pointer (step S255) to move data of the storage block Block_A to a spare storage block. After the "storage block data-moving operation" is completed, the controller 110 may reset the group age parameter Age_1 corresponding to the corresponding logical block address group (or the sub mapping table SMT_1) to the initial value.

Implementation of the "scanning operation" of the invention is not limited to the flow of FIG. 3. In some other embodiments, the "scanning operation" may include following operations. It is assumed that the group age parameter Age_1 exceeds the predetermined range (for example, greater than a threshold value), and the non-volatile storage blocks (physical blocks) Block_A, Block_B and Block_C corresponding to the first logical block address group (or the sub mapping table SMT_1) of the group age parameter Age_1 are illustrated in FIG. 5. Since the group age parameter Age_1 is greater than the threshold value, the scanning operation is performed to the non-volatile storage blocks (physical blocks) Block_A, Block_B and Block_C corresponding to the first logical block address group (or the sub mapping table SMT_1). Referring to FIG. 1 and FIG. 5, the controller 110 may use a page pointer, and the page pointer may point to a physical page of one storage block among the non-volatile storage blocks corresponding to the corresponding logical block address group (the first logical block address group, or the sub mapping table SMT_1). For example, the page pointer may point to the physical page Page_A0 of the non-volatile storage block Block_A. The controller 110 may check the error-bit quantity of the physical page Page_A0 pointed by the page pointer. When the error-bit quantity of the physical page Page_A0 pointed by the page pointer is smaller than the first threshold value, the controller 110 changes the page pointer to point to a physical page of another storage block (for example, the physical page Page_B0 of the non-volatile storage block Block_B) among the non-volatile storage blocks Block_A, Block_B and Block_C. The controller 110 may check the error-bit quantity of the physical page Page_B0 pointed by the page pointer. When the error-bit quantity of the physical page Page_B0 pointed by the page pointer is smaller than the first threshold value, the controller 110 changes the page pointer to point to a physical page of another storage block (for example, the physical page Page_C0 of the non-volatile storage block Block_C) among the non-volatile storage blocks Block_A, Block_B and Block_C. The controller 110 may check the error-bit quantity of the physical page Page_C0 pointed by the page pointer. When the error-bit quantity of the physical page Page_C0 pointed by the page pointer is smaller than the first threshold value, the controller 110 changes the page pointer to point to a physical page of another storage block (for example, the physical page Page_A1 of the non-volatile storage block Block_A) among the non-volatile storage blocks Block_A, Block_B and Block_C. Deduced by analogy, when the scanning operation of all of the physical pages of the non-volatile storage blocks Block_A, Block_B and Block_C corresponding to the corresponding logical block address group (the first logical block address group, or the sub mapping table SMT_1) is completed, i.e. when the error-bit quantities of all of the physical pages of the non-volatile storage blocks Block_A, Block_B and Block_C are smaller than the first threshold value, the controller 110 may reset the group age parameter Age_1 corresponding to the corresponding logical block address group (the first logical block address group, or the sub mapping table SMT_1) to the initial value. When the error-bit quantity of the physical page (for example, the physical page Page_C0) pointed by the page pointer is greater than the threshold value, the controller 110 may perform the "storage block data-moving operation" to the storage block containing the physical page (for example, the storage block Block_C) to move data of the storage block to a spare storage block. In an embodiment, after the data of the storage block containing the physical page (for example, the storage block Block_C) is moved, the group age parameter Age_1 corresponding to the storage block (for example, the storage block Block_C) is reset to the initial value.

In some other embodiments, the "scanning operation" may include following operations. It is assumed that the group age parameter Age_1 exceeds the predetermined range (for example, greater than the threshold value), and the non-volatile storage blocks (physical blocks) Block_A, Block_B and Block_C corresponding to the first logical block address group (or the sub mapping table SMT_1) of the group age parameter Age_1 are illustrated in FIG. 5. Since the group age parameter Age_1 is greater than the threshold value, the scanning operation is performed to the non-volatile storage blocks (physical blocks) Block_A, Block_B and Block_C corresponding to the first logical block address group (or the sub mapping table SMT_1). Referring to FIG. 1 and FIG. 5, the controller 110 may use a block pointer, and the block pointer may point to one storage block among the non-volatile storage blocks corresponding to the corresponding logical block address group (the first logical block address group, or the sub mapping table SMT_1). For example, the block pointer may point to the non-volatile storage block Block_A among the non-volatile storage blocks (physical blocks) Block_A, Block_B and Block_C. The controller 110 may check the error-bit quantities of all of the physical pages of the storage block Block_A pointed by the block pointer. When the error-bit quantities of the storage block Block_A pointed by the block pointer are smaller than the threshold value, the controller 110 changes the block pointer to point to another storage block (for example, the storage block Block_B) among the non-volatile storage blocks Block_A, Block_B and Block_C. The controller 110 may check the error-bit quantities of the all of the physical pages of the storage block Block_B pointed by the block pointer. When the error-bit quantities of the storage block Block_B pointed by the block pointer are smaller than the threshold value, the controller 110 changes the block pointer to point to another storage block (for example, the storage block Block_C) among the non-volatile storage blocks Block_A, Block_B and Block_C. The controller 110 may check the error-bit quantities of all of the physical pages of the storage block Block_C pointed by the block pointer. When the error-bit quantities of the storage block Block_C pointed by the block pointer is smaller than the threshold value, the controller 110 changes the block pointer to point to another storage block (for example, the storage block Block_A) among the non-volatile storage blocks Block_A, Block_B and Block_C.

When the scanning operation of all of the non-volatile storage blocks Block_A, Block_B and Block_C corresponding to the corresponding logical block address group (the first logical block address group, or the sub mapping table SMT_1) is completed, i.e. when the error-bit quantities of all of the non-volatile storage blocks Block_A, Block_B and Block_C are smaller than the threshold value, the controller 110 may reset the group age parameter Age_1 corresponding to the corresponding logical block address group (the first logical block address group, or the sub mapping table SMT_1) to the initial value. When the error-bit quantities of the storage block (for example, the storage block Block_C) pointed by the block pointer is greater than the threshold value, the controller 110 may perform the "storage block data-moving operation" to the storage block Block_C pointed by the block pointer to move data of the storage block Block_C to a spare storage block. In an embodiment, after the data of the storage block (for example, the storage block Block_C) is moved, the group age parameter Age_1 corresponding to the storage block (for example, the storage block Block_C) is reset to the initial value.

In some other embodiments, after a data writing operation performed to a certain physical block is completed, the controller 110 may subtract a step value from a group age parameter corresponding to a certain physical block in the group age parameters Age_1-Age_n. Therefore, in some other embodiments, one or a plurality of the steps of FIG. 3 can be correspondingly changed. For example, after entering the idle period, the controller 110 may execute the step S310 to find the "minimum one" from the respective group age parameters Age_1-Age_n of the logical block address groups (or the sub mapping tables SMT_1-SMT_n). In the step S320, the controller 110 may check whether the "minimum age parameter" found in the step S310 is "smaller" than the threshold value. The threshold value can be determined according to an actual design requirement. When the "minimum age parameter" found in the step S310 is not "smaller" than the threshold value, it represents that data stored in all of the physical blocks of the non-volatile storage circuit 130 is "young", and the flow of FIG. 3 is ended (to wait for a next idle period). When the "minimum age parameter" found in the step S310 is "smaller" than the threshold value, it represents that the data stored in one or a plurality of non-volatile storage blocks (the physical blocks of the non-volatile storage circuit 130) corresponding to the "minimum age parameter" is too "old". Therefore, the controller 110 may execute the step S250 to perform a scanning operation to the non-volatile storage blocks (the physical blocks of the non-volatile storage circuit 130) corresponding to a certain logical block address group corresponding to the "minimum age parameter" found in the step S310.

It should be noted that in different application situations, related functions of the controller 110 and/or the main memory 120 can be implemented as software, firmware or hardware by using general programming languages, for example, C or C++, hardware description languages, for example, Verilog HDL or VHDL or other suitable programming languages. The software (or firmware) capable of implementing the related functions can be stored in any computer-assessable medias, for example, magnetic tapes, semiconductor memories, magnetic disks or compact disks, for example, CD-ROM or DVD-ROM, or the software (or firmware) can be transmitted through the Internet, wired communication, wireless communication or other communication media. The software (or firmware) can be stored in the computer-assessable medias to facilitate a processor of the computer to access/execute programming codes of the software (or firmware). Moreover, the apparatus and method of the invention can be implemented through a combination of hardware and software.

In summary, the NVM apparatus 100 and an operating method thereof of the invention may record the respective group age parameters Age_1-Age_n of a plurality of logical block address groups (or the sub mapping tables SMT_1-SMT_n). The group age parameters Age_1-Age_n respectively represent a time length of a period when each of the logical block address groups is not written with data. In case that the writing operation is not performed to a physical block for a long time, along with increase of time, a quantity of error bits of the physical block is increased. The controller 110 of the non-volatile memory apparatus 100 may flexibly determine a timing of the scanning operation according to the group age parameters Age_1-Age_n, so as to opportunely check the error-bit quantity of the corresponding storage block (physical block) of the non-volatile storage circuit 130. The object of each scanning operation is not all of the storage blocks of the non-volatile storage circuit 130, thus it avoids influencing an operating frequency of the NVM apparatus 100. According to the result of the scanning operation, the controller may dynamically determine whether to perform the storage block data-moving operation, so as to avoid data loss of the storage block (physical block).

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A non-volatile memory apparatus, comprising:
   a non-volatile storage circuit, having a plurality of non-volatile storage blocks addressed by a plurality of physical block addresses;
   a main memory, configured to store a mapping table, wherein the mapping table is configured to record a transforming relationship between a plurality of logical block addresses and the physical block addresses; and
   a controller, coupled to the main memory and the non-volatile storage circuit,
   wherein the controller groups the logical block addresses into a plurality of logical block address groups, each of the logical block address groups comprises a plurality of logical block addresses, each of the logical block address groups is assigned with a group age parameter, adjusting of the group age parameters is triggered by a writing instruction of a host, the controller performs a scanning operation to the non-volatile storage blocks corresponding to the logical block addresses of a corresponding logical block address group corresponding to an age parameter of the group age parameters so as to check an error-bit quantity when the age parameter of the group age parameters exceeds a predetermined range, and the controller decides whether to perform a storage block data-moving operation to one storage block among the non-volatile storage blocks corresponding to the logical block addresses of the corresponding logical block address group based on a result of the scanning operation,
   wherein the scanning operation comprises:
      performing a rough scanning to the non-volatile storage blocks corresponding to the corresponding logical block address group by the controller;
      determining whether to perform a fine scanning to a suspicious storage block among the non-volatile storage blocks corresponding to the corresponding logical block address group by the controller according to a result of the rough scanning; and
      determining whether to perform the storage block data-moving operation to the suspicious storage block by the controller according to a result of the fine scanning, so as to move data of the suspicious storage block to a spare storage block.

2. The non-volatile memory apparatus as claimed in claim 1, wherein the controller respectively adds a step value to the group age parameters when the host sends the writing instruction to the controller.

3. The non-volatile memory apparatus as claimed in claim 1, wherein the controller respectively subtracts the group age parameters by a step value when the host sends the writing instruction to the controller.

4. The non-volatile memory apparatus as claimed in claim 1, wherein a pointer points to a target age parameter in the group age parameters, and when the host sends the writing instruction to the controller, the controller adds a step value to the target age parameter pointed by the pointer, and controls the pointer to point to a next age parameter in the group age parameters to serve as a new target age parameter.

5. The non-volatile memory apparatus as claimed in claim 1, wherein a pointer points to a target age parameter in the group age parameters, and when the host sends the writing instruction to the controller, the controller subtracts the target age parameter pointed by the pointer by a step value, and controls the pointer to point to a next age parameter in the group age parameters to serve as a new target age parameter.

6. The non-volatile memory apparatus as claimed in claim 1, wherein when the host sends the writing instruction to the controller, the controller transforms a target logical block address of the writing instruction into a target physical block address according to the mapping table, and accesses a non-volatile storage block addressed by the target physical block address according to the writing instruction, and resets an age parameter corresponding to the target logical block address in the group age parameters to an initial value.

7. The non-volatile memory apparatus as claimed in claim 1, wherein the controller compares the group age parameters with a threshold value to determine a relationship between the group age parameters and the predetermined range, and when one age parameter in the group age parameters is greater than the threshold value, the controller performs the scanning operation to the non-volatile storage blocks corresponding to the logical block addresses of the corresponding logical block address group corresponding to the age parameter, so as to check the error-bit quantity.

8. The non-volatile memory apparatus as claimed in claim 1, wherein the controller compares the group age parameters with a threshold value to determine a relationship between the group age parameters and the predetermined range, and when one age parameter in the group age parameters is smaller than the threshold value, the controller performs the scanning operation to the non-volatile storage blocks corresponding to the logical block addresses of the corresponding logical block address group corresponding to the age parameter, so as to check the error-bit quantity.

9. The non-volatile memory apparatus as claimed in claim 1, wherein the rough scanning comprises:
   pointing a physical page of a storage block among the non-volatile storage blocks corresponding to the corresponding logical block address group by a page pointer;
   checking an error-bit quantity of the physical page pointed by the page pointer and at least one adjacent physical page by the controller; and
   controlling the page pointer to point to a physical page of another storage block among the non-volatile storage blocks corresponding to the corresponding logical block address group by the controller when the error-bit quantity of the physical page pointed by the page pointer and the at least one adjacent physical page is smaller than a first threshold value.

10. The non-volatile memory apparatus as claimed in claim 9, wherein the controller performs the fine scanning to the storage block containing the physical page pointed by the page pointer when the error-bit quantity of the physical page pointed by the page pointer and the at least one adjacent physical page is greater than the first threshold value.

11. The non-volatile memory apparatus as claimed in claim 1, wherein the rough scanning comprises:
   pointing a physical page of a storage block among the non-volatile storage blocks corresponding to the corresponding logical block address group by a page pointer;
   checking an error-bit quantity of the physical page pointed by the page pointer by the controller; and
   controlling the page pointer to point to a physical page of another storage block among the non-volatile storage blocks corresponding to the corresponding logical block address group by the controller when the error-bit quantity of the physical page pointed by the page pointer is smaller than a first threshold value.

12. The non-volatile memory apparatus as claimed in claim 11, wherein the controller performs the fine scanning to the storage block containing the physical page pointed by the page pointer when the error-bit quantity of the physical page pointed by the page pointer is greater than the first threshold value.

13. The non-volatile memory apparatus as claimed in claim 1, wherein the controller resets the age parameter corresponding to the corresponding logical block address group to an initial value when the rough scanning of all of the physical pages of the non-volatile storage blocks corresponding to the corresponding logical block address group is completed.

14. The non-volatile memory apparatus as claimed in claim 1, wherein the fine scanning comprises:
   pointing a physical page of a storage block among the non-volatile storage blocks corresponding to the corresponding logical block address group by a page pointer;
   checking, by the controller, respective error-bit quantities of valid physical pages of the storage block containing the physical page pointed by the page pointer; and
   not to reset the age parameter corresponding to the corresponding logical block address group by the controller when the respective error-bit quantities of the valid physical pages of the storage block containing the physical page pointed by the page pointer are all smaller than a second threshold value.

15. The non-volatile memory apparatus as claimed in claim 1, wherein the fine scanning comprises:
   pointing a physical page of a storage block among the non-volatile storage blocks corresponding to the corresponding logical block address group by a page pointer;
   checking respective error-bit quantities of all of physical pages of the storage block containing the physical page pointed by the page pointer by the controller; and
   not to reset the age parameter corresponding to the corresponding logical block address group by the controller when the respective error-bit quantities of all of the physical pages of the storage block containing the physical page pointed by the page pointer are all smaller than a second threshold value.

16. The non-volatile memory apparatus as claimed in claim 1, wherein when the error-bit quantity of a physical page in the suspicious storage block is greater than a second threshold value, the controller performs the storage block data-moving operation to the suspicious storage block to move data in the suspicious storage block to the spare storage block, and the controller resets the age parameter corresponding to the corresponding logical block address group to the initial value.

17. An operating method of a non-volatile memory apparatus, comprising:
   configuring a non-volatile storage circuit, wherein the non-volatile storage circuit has a plurality of non-volatile storage blocks addressed by a plurality of physical block addresses;
   configuring a main memory to store a mapping table, wherein the mapping table is configured to record a transforming relationship between a plurality of logical block addresses and the physical block addresses;
   grouping the logical block addresses into a plurality of logical block address groups by a controller, wherein each of the logical block address groups comprises a plurality of logical block addresses, and each of the logical block address groups is assigned with a group age parameter;

triggering adjusting of the group age parameters by a writing instruction of a host;

performing a scanning operation to the non-volatile storage blocks corresponding to the logical block addresses of a corresponding logical block address group corresponding to an age parameter of the group age parameters by the controller when the age parameter of the group age parameters exceeds a predetermined range, so as to check an error-bit quantity; and deciding whether to perform a storage block data-moving operation to one storage block among the non-volatile storage blocks corresponding to the logical block addresses of the corresponding logical block address group by the controller based on a result of the scanning operation, wherein the scanning operation comprises:

performing a rough scanning to the non-volatile storage blocks corresponding to the corresponding logical block address group by the controller;

determining whether to perform a fine scanning to a suspicious storage block among the non-volatile storage blocks corresponding to the corresponding logical block address group by the controller according to a result of the rough scanning; and determining whether to perform the storage block data-moving operation to the suspicious storage block by the controller according to a result of the fine scanning, so as to move data of the suspicious storage block to a spare storage block.

18. The operating method of the non-volatile memory apparatus as claimed in claim 17, wherein the step of triggering adjusting of the group age parameters by the writing instruction of the host comprises:

respectively adding a step value to the group age parameters by the controller when the host sends the writing instruction to the controller.

19. The operating method of the non-volatile memory apparatus as claimed in claim 17, wherein the step of triggering adjusting of the group age parameters by the writing instruction of the host comprises:

respectively subtracting the group age parameters by a step value by the controller when the host sends the writing instruction to the controller.

20. The operating method of the non-volatile memory apparatus as claimed in claim 17, wherein the step of triggering adjusting of the group age parameters by the writing instruction of the host comprises:

pointing a target age parameter in the group age parameters by a pointer; and adding, by the controller, a step value to the target age parameter pointed by the pointer when the host sends the writing instruction to the controller, and controlling the pointer to point to a next age parameter in the group age parameters to serve as a new target age parameter.

21. The operating method of the non-volatile memory apparatus as claimed in claim 17, wherein the step of triggering adjusting of the group age parameters by the writing instruction of the host comprises:

pointing a target age parameter in the group age parameters by a pointer; and subtracting, by the controller, the target age parameter pointed by the pointer by a step value when the host sends the writing instruction to the controller, and controlling the pointer to point to a next age parameter in the group age parameters to serve as a new target age parameter.

22. The operating method of the non-volatile memory apparatus as claimed in claim 17, wherein the step of triggering adjusting of the group age parameters by the writing instruction of the host comprises:

transforming a target logical block address of the writing instruction into a target physical block address by the controller according to the mapping table when the host sends the writing instruction to the controller, and accessing a non-volatile storage block addressed by the target physical block address according to the writing instruction, and resetting an age parameter corresponding to the target logical block address in the group age parameters to an initial value.

23. The operating method of the non-volatile memory apparatus as claimed in claim 17, further comprising:

comparing the group age parameters with a threshold value by the controller to determine a relationship between the group age parameters and the predetermined range; and performing the scanning operation to the non-volatile storage blocks corresponding to the logical block addresses of the corresponding logical block address group corresponding to one age parameter in the group age parameters by the controller when the age parameter in the group age parameters is greater than the threshold value, so as to check the error-bit quantity.

24. The operating method of the non-volatile memory apparatus as claimed in claim 17, further comprising:

comparing the group age parameters with a threshold value by the controller to determine a relationship between the group age parameters and the predetermined range; and performing the scanning operation to the non-volatile storage blocks corresponding to the logical block addresses of the corresponding logical block address group corresponding to one age parameter in the group age parameters by the controller when the age parameter in the group age parameters is smaller than the threshold value, so as to check the error-bit quantity.

25. The operating method of the non-volatile memory apparatus as claimed in claim 17, wherein the rough scanning comprises:

pointing a physical page of a storage block among the non-volatile storage blocks corresponding to the corresponding logical block address group by a page pointer;

checking an error-bit quantity of the physical page pointed by the page pointer and at least one adjacent physical page by the controller; and controlling the page pointer to point to a physical page of another storage block among the non-volatile storage blocks corresponding to the corresponding logical block address group by the controller when the error-bit quantity of the physical page pointed by the page pointer and the at least one adjacent physical page is smaller than a first threshold value.

26. The operating method of the non-volatile memory apparatus as claimed in claim 25, wherein the controller performs the fine scanning to the storage block containing the physical page pointed by the page pointer when the error-bit quantity of the physical page pointed by the page pointer and the at least one adjacent physical page is greater than the first threshold value.

27. The operating method of the non-volatile memory apparatus as claimed in claim 17, wherein the rough scanning comprises:
  pointing a physical page of a storage block among the non-volatile storage blocks corresponding to the corresponding logical block address group by a page pointer;
  checking an error-bit quantity of the physical page pointed by the page pointer by the controller; and
  controlling the page pointer to point to a physical page of another storage block among the non-volatile storage blocks corresponding to the corresponding logical block address group by the controller when the error-bit quantity of the physical page pointed by the page pointer is smaller than a first threshold value.

28. The operating method of the non-volatile memory apparatus as claimed in claim 27, wherein the controller performs the fine scanning to the storage block containing the physical page pointed by the page pointer when the error-bit quantity of the physical page pointed by the page pointer is greater than the first threshold value.

29. The operating method of the non-volatile memory apparatus as claimed in claim 17, wherein the controller resets the age parameter corresponding to the corresponding logical block address group to an initial value when the rough scanning of all of the physical pages of the non-volatile storage blocks corresponding to the corresponding logical block address group is completed.

30. The operating method of the non-volatile memory apparatus as claimed in claim 17, wherein the fine scanning comprises:
  pointing a physical page of a storage block among the non-volatile storage blocks corresponding to the corresponding logical block address group by a page pointer;
  checking, by the controller, respective error-bit quantities of valid physical pages of the storage block containing the physical page pointed by the page pointer; and
  not to reset the age parameter corresponding to the corresponding logical block address group by the controller when the respective error-bit quantities of the valid physical pages of the storage block containing the physical page pointed by the page pointer are all smaller than a second threshold value.

31. The operating method of the non-volatile memory apparatus as claimed in claim 17, wherein the fine scanning comprises:
  pointing a physical page of a storage block among the non-volatile storage blocks corresponding to the corresponding logical block address group by a page pointer;
  checking respective error-bit quantities of all of physical pages of the storage block containing the physical page pointed by the page pointer by the controller; and
  not to reset the age parameter corresponding to the corresponding logical block address group by the controller when the respective error-bit quantities of all of the physical pages of the storage block containing the physical page pointed by the page pointer are all smaller than a second threshold value.

32. The operating method of the non-volatile memory apparatus as claimed in claim 17, wherein when the error-bit quantity of a physical page in the suspicious storage block is greater than a second threshold value, the controller performs the storage block data-moving operation to the suspicious storage block to move data in the suspicious storage block to the spare storage block, and the controller resets the age parameter corresponding to the corresponding logical block address group to the initial value.

33. A non-volatile memory apparatus, comprising:
  a non-volatile storage circuit, having a plurality of non-volatile storage blocks addressed by a plurality of physical block addresses;
  a main memory, configured to store a mapping table, wherein the mapping table is configured to record a transforming relationship between a plurality of logical block addresses and the physical block addresses; and
  a controller, coupled to the main memory and the non-volatile storage circuit,
  wherein the controller groups the logical block addresses into a plurality of logical block address groups, each of the logical block address groups comprises a plurality of logical block addresses, each of the logical block address groups is assigned with a group age parameter, adjusting of the group age parameters is triggered by a writing instruction of a host, the controller performs a scanning operation to the non-volatile storage blocks corresponding to the logical block addresses of a corresponding logical block address group corresponding to an age parameter of the group age parameters so as to check an error-bit quantity when the age parameter of the group age parameters exceeds a predetermined range, and the controller decides whether to perform a storage block data-moving operation to one storage block among the non-volatile storage blocks corresponding to the logical block addresses of the corresponding logical block address group based on a result of the scanning operation;
  wherein the scanning operation comprises:
    pointing a physical page of a storage block among the non-volatile storage blocks corresponding to the corresponding logical block address group by a page pointer;
    checking, by the controller, an error-bit quantity of the physical page pointed by the page pointer; and
    controlling the page pointer to point to a physical page of another storage block among the non-volatile storage blocks corresponding to the corresponding logical block address group by the controller when the error-bit quantity of the physical page pointed by the page pointer is smaller than a threshold value.

34. The non-volatile memory apparatus as claimed in claim 33, wherein the controller resets the age parameter corresponding to the corresponding logical block address group to an initial value when the scanning operation of all of the physical pages of the non-volatile storage blocks corresponding to the corresponding logical block address group is completed.

35. The non-volatile memory apparatus as claimed in claim 33 wherein when the error-bit quantity of the physical page pointed by the page pointer is greater than the threshold value, the controller performs the storage block data-moving operation to the storage block containing the physical page pointed by the page pointer to move data in the storage block to a spare storage block.

36. A non-volatile memory apparatus, comprising:
  a non-volatile storage circuit, having a plurality of non-volatile storage blocks addressed by a plurality of physical block addresses;
  a main memory, configured to store a mapping table, wherein the mapping table is configured to record a transforming relationship between a plurality of logical block addresses and the physical block addresses; and a controller, coupled to the main memory and the non-volatile storage circuit, wherein the controller groups the logical block addresses into a plurality of logical block address groups, each of the logical block address groups comprises a plurality of logical block addresses, each of the logical block address groups is assigned with a group age parameter, adjusting of the group age parameters is triggered by a writing instruction of a host, the controller performs a scanning operation to the non-volatile storage blocks corresponding to the logical block addresses of a corresponding logical block address group corresponding to an age parameter of the group age parameters so as to check an error-bit quantity when the age parameter of the group age parameters exceeds a predetermined range, and the controller decides whether to perform a storage block data-moving operation to one storage block among the non-volatile storage blocks corresponding to the logical block addresses of the corresponding logical block address group based on a result of the scanning operation, wherein the scanning operation comprises:
  pointing a storage block among the non-volatile storage blocks corresponding to the corresponding logical block address group by a block pointer;
  checking, by the controller, an error-bit quantity of the storage block pointed by the block pointer; and
  controlling the block pointer to point to another storage block among the non-volatile storage blocks corresponding to the corresponding logical block address group by the controller when the error-bit quantity of the storage block pointed by the block pointer is smaller than a threshold value.

37. The non-volatile memory apparatus as claimed in claim 36, wherein the controller resets the age parameter corresponding to the corresponding logical block address group to an initial value when the scanning operation of the non-volatile storage blocks corresponding to the corresponding logical block address group is completed.

38. The non-volatile memory apparatus as claimed in claim 36, wherein when the error-bit quantity of the storage block pointed by the block pointer is greater than the threshold value, the controller performs the storage block data-moving operation to the storage block pointed by the block pointer to move data in the storage block pointed by the block pointer to a spare storage block.

39. An operating method of a non-volatile memory apparatus, comprising:
  configuring a non-volatile storage circuit, wherein the non-volatile storage circuit has a plurality of non-volatile storage blocks addressed by a plurality of physical block addresses;
  configuring a main memory to store a mapping table, wherein the mapping table is configured to record a transforming relationship between a plurality of logical block addresses and the physical block addresses;
  grouping the logical block addresses into a plurality of logical block address groups by a controller, wherein each of the logical block address groups comprises a plurality of logical block addresses, and each of the logical block address groups is assigned with a group age parameter;
  triggering adjusting of the group age parameters by a writing instruction of a host;
  performing a scanning operation to the non-volatile storage blocks corresponding to the logical block addresses of a corresponding logical block address group corresponding to an age parameter of the group age parameters by the controller when the age parameter of the group age parameters exceeds a predetermined range, so as to check an error-bit quantity; and
  deciding whether to perform a storage block data-moving operation to one storage block among the non-volatile storage blocks corresponding to the logical block addresses of the corresponding logical block address group by the controller based on a result of the scanning operation, wherein the scanning operation comprises:
  pointing a physical page of a storage block among the non-volatile storage blocks corresponding to the corresponding logical block address group by a page pointer;
  checking, by the controller, an error-bit quantity of the physical page pointed by the page pointer; and
  controlling the page pointer to point to a physical page of another storage block among the non-volatile storage blocks corresponding to the corresponding logical block address group by the controller when the error-bit quantity of the physical page pointed by the page pointer is smaller than a threshold value.

40. The operating method of the non-volatile memory apparatus as claimed in claim 39, wherein the controller resets the age parameter corresponding to the corresponding logical block address group to an initial value when the scanning operation of all of the physical pages of the non-volatile storage blocks corresponding to the corresponding logical block address group is completed.

41. The operating method of the non-volatile memory apparatus as claimed in claim 39, wherein when the error-bit quantity of the physical page pointed by the page pointer is greater than the threshold value, the controller performs the storage block data-moving operation to the storage block containing the physical page pointed by the page pointer to move data in the storage block to a spare storage block.

42. An operating method of a non-volatile memory apparatus, comprising:
  configuring a non-volatile storage circuit, wherein the non-volatile storage circuit has a plurality of non-volatile storage blocks addressed by a plurality of physical block addresses;
  configuring a main memory to store a mapping table, wherein the mapping table is configured to record a transforming relationship between a plurality of logical block addresses and the physical block addresses;
  grouping the logical block addresses into a plurality of logical block address groups by a controller, wherein each of the logical block address groups comprises a plurality of logical block addresses, and each of the logical block address groups is assigned with a group age parameter;
  triggering adjusting of the group age parameters by a writing instruction of a host;
  performing a scanning operation to the non-volatile storage blocks corresponding to the logical block addresses of a corresponding logical block address group corresponding to an age parameter of the group age parameters by the controller when the age parameter of the group age parameters exceeds a predetermined range, so as to check an error-bit quantity; and
  deciding whether to perform a storage block data-moving operation to one storage block among the non-volatile storage blocks corresponding to the logical block addresses of the corresponding logical block address group by the controller based on a result of the scanning operation, wherein the scanning operation comprises:

pointing a storage block among the non-volatile storage blocks corresponding to the corresponding logical block address group by a block pointer;

checking, by the controller, an error-bit quantity of the storage block pointed by the block pointer; and controlling the block pointer to point to another storage block among the non-volatile storage blocks corresponding to the corresponding logical block address group by the controller when the error-bit quantity of the storage block pointed by the block pointer is smaller than a threshold value.

43. The operating method of the non-volatile memory apparatus as claimed in claim 42 wherein the controller resets the age parameter corresponding to the corresponding logical block address group to an initial value when the scanning operation of the non-volatile storage blocks corresponding to the corresponding logical block address group is completed.

44. The operating method of the non-volatile memory apparatus as claimed in claim 42, wherein when the error-bit quantity of the storage block pointed by the block pointer is greater than the threshold value, the controller performs the storage block data-moving operation to the storage block pointed by the block pointer to move data in the storage block pointed by the block pointer to a spare storage block.

* * * * *